May 17, 1966

E. A. SACK
ELECTROLUMINESCENT-FERROELECTRIC
DISPLAY WITH FEEDBACK CONTROL
Filed Oct. 22, 1962

3,252,048

WITNESSES:
Bernard R. Gieguez
James F. Young

INVENTOR
Edgar A. Sack
BY Ernest P. Klipfel
ATTORNEY 3,252,048
Patented May 17, 1966

3,252,048

ELECTROLUMINESCENT-FERROELECTRIC DISPLAY WITH FEEDBACK CONTROL

Edgar A. Sack, Penn Hills, Pa., assignor to Westinghouse Electric Corporation, Pittsburgh, Pa., a corporation of Pennsylvania Filed Oct. 22, 1962, Ser. No. 232,131
5 Claims. (Cl. 315—169)

The present invention relates to electrical-to-light transducers, and more particularly to electroluminescent ferroelectric information display apparatus.

A plurality of electrical-to-light transducer elements may be arranged in a matrix to provide a visible display of incoming electrical information. Individual elements may be of the electroluminescent-ferroelectric (ELF) type. Because of the visible light information output desired, it is very desirable to have a stable output in response to incoming elecctrical information. Moreover, it is desirable in many applications to operate the display in a binary, that is, bistable manner so that the various elements of the matrix arrangement may be switched in response to incoming electrical information in binary number form.

It is therefore an object of the present invention to provide a new and improved electroluminescent-ferroelectric display element providing stable operation.

It is a further object of the present invention to provide new and improved electroluminescent-ferroelectric display elements providing stable operation in at least two states.

Broadly, the present invention provides an electcrical-to-light transducer in which an electroluminescent ferroelectric circuit is provided, wherein a feedback signal is supplied to a control point in the circuit to interact with the circuit characteristics to permit stable operation in at least two stable states.

Figure 1:
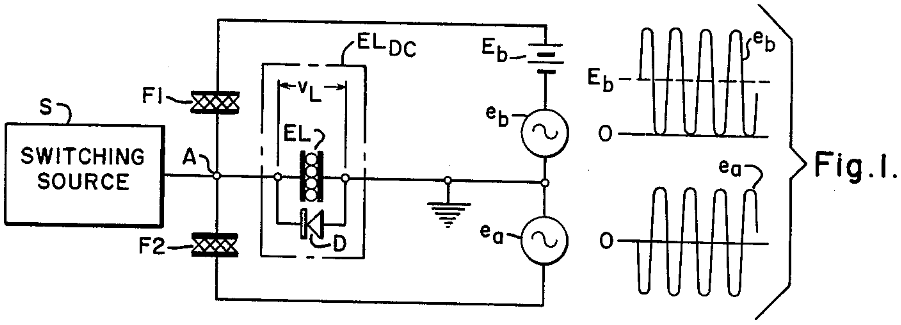
Figure 2:
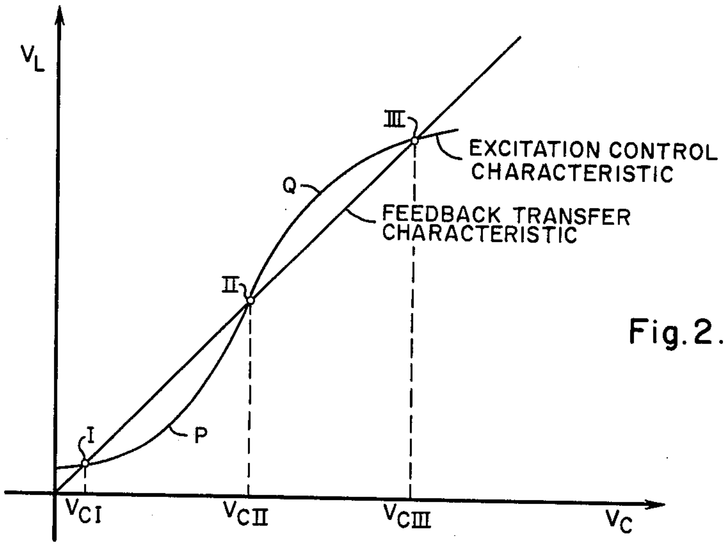

These and other objects of the present invention will become more apparent when considered in view of the following specification and drawings, in which:

FIGURE 1 is a schematic diagram of one embodiment of the present invention and the necessary excitation wave forms for the operation of this embodiment; and FIG. 2 is a plot of the excitation control characteristics of an electroluminescent cell as used in the present invention; and of the feedback transfer characteristic desired for the invention.

Referring to FIG. 1, an electroluminescent ferroelectric bridge circuit, with suitable excitation sources, is shown as it may be utilized in the present invention. Although a bridge circuit is shown, other circuit configurations may of course be used. An electroluminescent cell EL is connected to the control point A between the non-linear ferroelectric capacitors F1 and F2. The alternating excitation source $e_a$ is connected between ground and the other terminal of the ferroelectric capacitor F2 from the control point A. The alternating excitation source $e_b$ is connected in series with the direct source $E_b$ between ground and the other terminal of the ferroelectric capacitor F1 from the control point A. The excitation waveforms are also shown in FIG. 1, with the waveform supplied by source $e_a$ alternating about a ground potential, while the alternating waveform supplied by source $e_b$ alternates about the D.C. reference level $E_b$. With these excitations, the instantaneous voltage across the electroluminescent cell EL will be $v_L$. The alternating component of the voltage $v_L$ is the light producing excitation voltage $V_L$. The control potential of the electroluminescent cell is the average or D.C. component of $v_L$ which is defined as $V_C$. Due to the nonlinearity of the ferroelectric capacitors F1 and F2, and the dissymmetry of the excitation and bias sources, $V_L$ is a function of $V_C$. A plot of $V_L$ versus $V_C$ is known as the excitation control characteristic of the element.

A plot of a typical excitation control characteristic is shown in FIG. 2. The exact shape of this curve, depends on the detail bridge operation conditions, but the curve shown in FIG. 2 is a typical one.

Since the amount of light produced from the electroluminescent cell is directly related to the excitation voltage $V_L$, the light output of the cell may be controlled by controlling the control potential $V_C$. The control potential $V_C$, being a D.C. potential, may be controlled by applying a direct potential to the control point A. The switching source S is shown connected to the control point A to supply predetermined potentials to the control point. A unidirectional device D, which for example may be a diode, is connected directly across the electroluminescent cell EL. The parallel combination of the electroluminescent cell EL and the diode D is enclosed within the dotted block $EL_{DC}$. By placing the diode D across the electroluminescent cell EL, a feedback voltage proportional to $V_L$ is fed back to the control point A as the voltage $V_C$, the control potential. With the feedback voltage being proportional to $V_L$, the feedback transfer characteristic will be a straight line, as shown by the curve in FIG. 2. However, depending on the rectification and feedback means utilized, a feedback characteristic may be provided other than linear.

Referring to FIG. 2, feedback action results in providing stable intersections I and III and unstable intersection II of the feedback transfer characteristic with the excitation control characteristic. That is, the circuit will hold either of the states I or III until triggered into the other state III or I. Triggering may be accomplished in various ways. Assuming that the element is operating in state I, if by external means, for example by the switching source S, the control potential $V_{CI}$ is momentarily made larger than $V_{CII}$, the state will switch from I to III. Or, if the element is in state III, by making $V_{CIII}$ momentarily smaller than $V_{CII}$, the state will be switched from state III to state I. Switching may also be accomplished by displacing the feedback transfer characteristic by external means. That is, if the feedback transfer characteristic is displaced to become tangent to the point P of the excitation control characteristic the element may switch from state I to state III. The reverse change, from state III to state I, may be accomplished by displacing the feedback transfer characteristic to be tangent to the excitation control characteristic at the point Q of the excitation control characteristic. Also by changing the slope of the feedback transfer characteristic, modifying the shape of the excitation control characteristic or by utilizing both of these techniques, the desired switching may be effected. Such changes in characteristics may be obtained by modifying the feedback or bridge parameters.

Rather than the parallel combination of the A.C. electroluminescent cell EL and the diode D, the block $EL_{DC}$ may comprise a polarity sensitive thin film electroluminescent layer device. Such devices are disclosed in copending application Serial No. 186,533, filed by the same inventor as the instant application, and U.S. Patent No. 3,044,902, issued July 17, 1962, by W. Thornton; both the application and the patent being assigned to the same assignee as the present application. Thin film electroluminescent elements of this type have the characteristic such that current flow may pass more readily in one direction than in the other. Thus, the rectifying action of the electroluminescent cell itself can provide feedback action directly with no additional components required to give the desired intersection of the excitation control characteristic and the feedback transfer characteristic. Also, it is not necessary that the excitation control characteristic have the shape given in the example of FIG. 2. The feedback transfer characteristic may be designed to be nonlinear in such fashion as to give desired intersections for bistable operation.

Although the present invention has been described with a certain degree of particularity it should be understood that the present disclosure has been made only by way of example and that numerous changes in details of the circuitry and the combination and arrangement of parts and components may be resorted to without departing from the scope and spirit of the present invention.

I claim as my invention:

1. A display element comprising, electroluminescent means operatively connected to ferroelectric capacitor means so that said element has a predetermined excitation control characteristic, said electroluminescent means being polarity sensitive to provide a feedback transfer characteristic that intersects said excitation control characteristic to permit at least two stable states of operation of said display element.

2. In an electrical-to-light transducer, the combination of: electroluminescent means operatively connected to ferroelectric capacitor means so that said transducer has a predetermined excitation control characteristic, said electroluminescent means being polarity sensitive to provide a feedback transfer characteristic that intersects said excitation control characteristic to permit at least two stable states of operation of said transducer, and control means to switch said transducer into its stable states.

3. A display element comprising, an electroluminescent cell operatively connected to ferroelectric capacitor means to provide a light output in response to electrical excitation, said element having a predetermined excitation control characteristic, a unidirectional device operatively connected across said electroluminescent cell to provide a feedback transfer characteristic that intersects said excitation control characteristic to permit at least two stable states of operation of said display element.

4. In an electrical-to-light transducer, the combination of: an electroluminescent cell operatively connected to ferroelectric capacitor means to provide a light output in response to electrical excitation, with said transducer having a predetermined excitation control characteristic, a unidirectional device operatively connected across said electroluminescent cell to provide a feedback transfer characteristic that intersects said excitation control characteristic to permit at least two stable states of operation of said transducer, and control means to switch said transducer into its stable states.

5. In an electrical-to-light transducer, the combination of: an electroluminescent cell operatively connected to ferroelectric capacitor means with a control point being formed therebetween, with a light output being provided in response to electrical excitation and a control potential being applied to said transducer, a unidirectional device operatively connected across said electroluminescent cell to provide feedback signals to said control point to permit at least two stable states of operation of said transducer, and control means operatively connected to said control point to switch said transducer into its stable states by controllably varying the control potential.

No references cited.

JOHN W. HUCKERT, *Primary Examiner.*

DAVID J. GALVIN, *Examiner.*

R. F. POLISSACK, *Assistant Examiner.*